United States Patent [19]

Emura

[11] Patent Number: 4,881,699

[45] Date of Patent: Nov. 21, 1989

[54] ROTOR-LOCKING MECHANISM FOR A FISHING REEL

[75] Inventor: Masaharu Emura, Hiroshima, Japan

[73] Assignee: Ryobi Ltd., Hiroshima, Japan

[21] Appl. No.: 134,545

[22] Filed: Dec. 16, 1987

Related U.S. Application Data

[63] Continuation of Ser. No. 792,924, Oct. 30, 1985, abandoned.

[30] Foreign Application Priority Data

Oct. 31, 1984 [JP] Japan ............................ 59-166139[U]

[51] Int. Cl.$^4$ ............................................ A01K 89/01
[52] U.S. Cl. .................................................. 242/248
[58] Field of Search .................... 242/84.1 R, 84.2 R, 242/84.2 G, 84.21 R; 188/82.3, 82.34

[56] References Cited

U.S. PATENT DOCUMENTS

| 4,163,528 | 8/1979 | Egasaki | 242/84.21 R |
| 4,208,020 | 6/1980 | Gifford | 242/84.2 G |
| 4,477,038 | 10/1984 | Yorikane | 242/84.21 R |
| 4,634,074 | 1/1987 | Ohmori | 242/84.21 R |
| 4,718,617 | 1/1988 | Vadasz | 242/84.2 G |

Primary Examiner—Joseph J. Hail, III
Assistant Examiner—Katherine Matecki
Attorney, Agent, or Firm—Finnegan, Henderson, Farabow, Garrett and Dunner

[57] ABSTRACT

A spinning type fishing reel having a projection on the inside of the rotor disposed to selectively engage a spring loaded pivoting lever arm. The arm is engaged with a lever and rotation of the arm by means of the lever engages the pivot arm with the projection on the rotor. This prevents unwanted rotation of the rotor during use of the reel.

3 Claims, 4 Drawing Sheets

ROTOR-LOCKING MECHANISM FOR A FISHING REEL

This application is a continuation of application Ser. No. 06/792,924, filed Oct. 30, 1985, now abandoned.

BACKGROUND OF THE INVENTION

This invention relates to a rotor-locking mechanism for a spinning reel for fishing.

In general, such a spinning reel is conventionally equipped with a mechanism for stopping the rotation of the rotor. Typically, a conventional spinning reel is used in such a manner that the bail arm is brought down to the line release position first and a fishing line is cast by picking up the line. Since the rotor is prevented from turning in the reverse direction by the aforesaid mechanis, when the line is cast, because the rotor is not prevented from turning in the line-winding direction, the inertial rotation of the handle arm may cause the rotor to turn when the line is cast. This will cause the bail arm to be positioned incorrectly, whereas in the case of a finger pickup type reel, the line may tangle with the line guard roller of the bail arm or be cut thereby. This may cause the loss of the catch during operation of the reel.

SUMMARY OF THE INVENTION

In view of the foregoing, it is an object of the present invention to provide a rotor locking mechanism for a spinning reel for fishing whereby the rotor is prevented from turning when a fishing line is being cast.

To achieve these and other objects of the invention there is provided a spinning type fishing reel which comprises a reel body, a rotor disposed to rotate with respect to the reel body, and a rotor locking means. The rotor locking means is disposed to selectively prevent the rotation of the rotor with respect to the reel body. The rotor locking means comprises a projection on the inner surface of a centering pawl. This projection can engage a backstop pawl which is also engaged to a spring disposed to apply a resilient force to the backstop pawl such that rotation of backstop pawl is resiliently opposed in both directions of rotation of the backstop pawl. A lever is engaged with the backstop pawl and is disposed to facilitate manual selective engagement of the backstop pawl with the projection. Preferably, the rotor locking means includes a shaft that is affixed to the backstop pawl with the shaft also being affixed to the lever mechanism. It is further preferred that the shaft be mounted in the reel body on the underside of the reel.

The invention will now be discussed in terms of several preferred embodiments which are depicted in the accompanying figures which form a part of this specification.

DESCRIPTION OF THE PREFERRED EMBODIMENTS

In accordance with the invention there is provided a spinning-type fishing reel. As here embodied the reel has a reel body 1 which is affixed by conventional means to a fishing pole (not shown).

Figure 1:
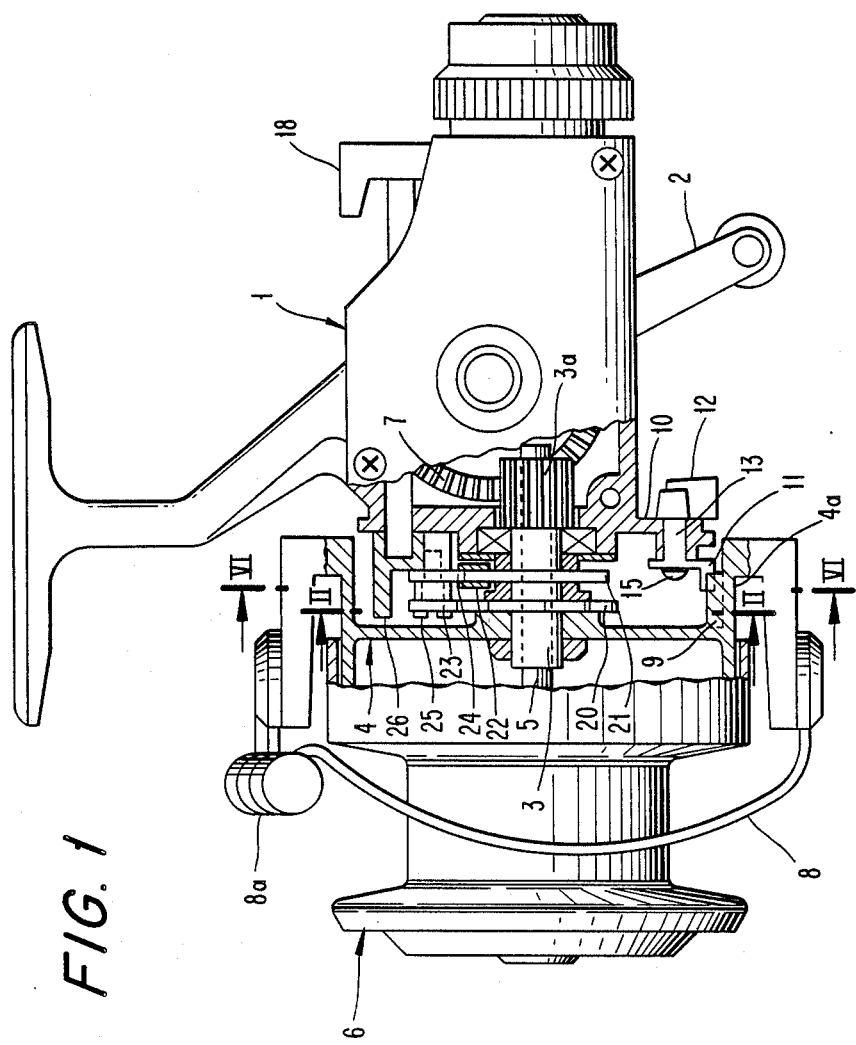
FIG. 1 is a partial cross-sectional side view of a spinning reel embodying the present invention.

As shown in FIG. 1, a rotor 4 is mounted on a tubular shaft 3 in the front portion of the reel body 1. The reel is equipped with a handle 2 so that the rotor 4 can be rotated with respect to the reel body 1. A spool 6 is fixed to a slide shaft 5 that is partially inserted in the tubular shaft 3. A pinion gear 3a is mounted on the tubular shaft 3 and is engaged with a main gear 7 which is driven by turning the handle 2. The slide shaft 5 is interlockingly coupled to the main gear 7 through an oscillating mechanism (not shown). When the rotor 4 is turned with the handle 2, the spool 6 simultaneously reciprocates back and forth. A fishing line (not shown) engaged on a line guide roller 8a of a bail arm 8 over the rotor 4 is thereby uniformly wound on the spool 6. This process of winding a fishing line is similar to the operation of conventional reels.

In accordance with the invention the reel includes a rotor. As here embodied, the rotor 4 is cylindrical with an H cross-sectional shape. A portion of the rotor locking means is a projection 9 on the inner surface of the rotor 4, specifically on the inside rear peripheral wall (on the reel body side) of the rotor 4.

In accordance with the invention, the reel includes rotor locking means for selectively preventing rotation of the rotor with respect to the reel body in a line-winding direction. A portion of the rotor locking means comprises the projection on the inner surface of the rotor noted above. The locking means further includes the projection 9 and a spring disposed to apply a resilient force to the arm such that rotation of the arm is resiliently opposed in both directions of rotation of the pivoting arm. Lever means engaged with the pivoting arm are disposed to facilitate manual, selective engagement of the pivot arm with said projection.

As here embodied, the reel body 1 has mounted on a flange 10 a pivot arm 11 in such a manner that the pivot arm 11 engages the projection 9 when the rotor 4 is turned in the direction where line is wound onto the spool 6. The pivot arm 11 is pivoted on a pivot shaft 13 so that it can turn with respect to the rotor 4 when the lever 12 is turned. A dead-point spring 14 is fixed to the pivot arm 11, whereby the resilient force of the spring 14 is sufficient to make the pivot arm 11 both catch and release the projection 9.

Figure 3:
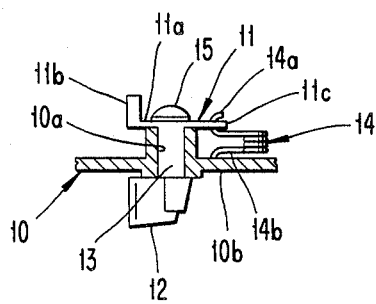
FIG. 3 is a partial cross section of the device as depicted in FIG. 2 along the line III—III.

As viewed together in FIGS. 1 and 3, the pivot arm 11 is rotationally mounted on the flange 10 by inserting the screw 13 from the lever 12 through the shaft opening 10a that is parallel with the tubular shaft 3 and the slide shaft 5. The screw shaft 13 is recessed into an end portion of the lever 12 and affixed by means of set screw 15 into the screw shaft 13.

Figure 2:
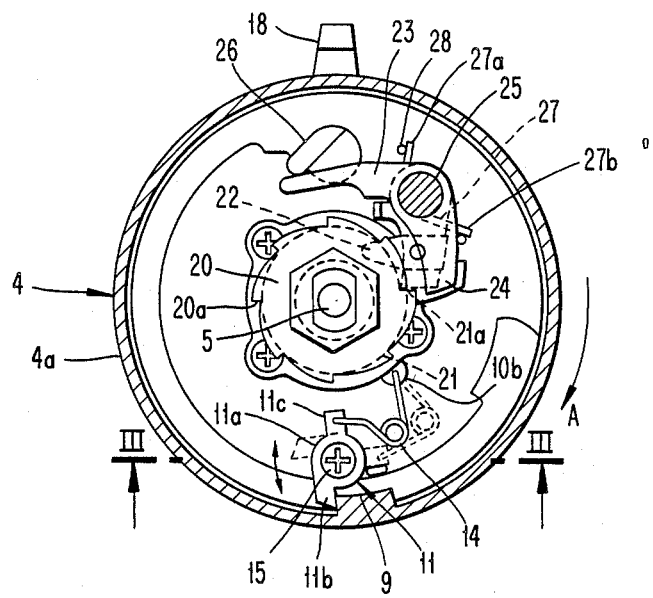
FIG. 2 is a cross-sectional view of the embodiment of FIG. 1 taken along the line II—II.

The pivot arm 11 is formed of sheet material and has an annular body 11a, an arm 11b projecting in the direction of the rotor 4 as shown in FIGS. 1 through 3 for engaging the projection 9. A piece 11c of the pivot arm protrudes symmetrically in the opposite direction from the arm 11b. The invention may further include a torsion spring having one end thereof engaged with the rotor body and in opposite end engaged with the pivot arm. As here embodied, the spring 14 has opposite ends 14a and 14b that are hooked on the piece 11c that protrudes from the pivot arm 11 and a spring peg 10b on the flange 10 so that the resilient force of the spring can be directed to both the lock and lock release positions relative to the projection 9.

In accordance with the invention, the embodiment of FIGS. 1 and 2 includes self-centering means for stopping the rotation of the rotor in a line-casting direction, thereby facilitating release of the line from the spool. The self-centering means includes a ratchet gear 20 having teeth 20a at equal intervals on the entire periphery thereof, and a centering ratchet 21 with one tooth 21a, both the ratchet gear 20 and the centering ratchet 21 being coaxially mounted on the tubular shaft 3 and spaced a predetermined distance apart in the axial direction. In the reel body 1, the ratchet gear 20 and the centering ratchet 21 are respectively equipped with an anti-reverse pawl, such as a backstop pawl 23 and a centering pawl 24 in such a manner that the backstop and centering pawls 23 and 24 are mounted with a stepped machine screw 25 such that the pawls 23 and 24 are moved in response to the movement of cam 26. There is also provided a spring 27 having one end 27a hookked on a boss 28 on the reel body 1 and the other 27b on the backstop pawl 23 so that the backstop pawl 23 is biased to engage resiliently with the ratchet gear 20. On both sides of the centering pawl 24 are machine-screwed (or riveted) tooth springs 22 whose free ends sandwich the centering ratchet 21 so that fricational resistance may be generated therebetween.

With respect to the backstop pawl 23 and the centering pawl 24, they are joined with each other by a projection 24a on the centering pawl 24, enabling the centering pawl 24 to interlockingly follow the backstop pawl 23 with the frictional resistance of the tooth springs 22.

A lever 18 functions to actuate the backstop pawl 23 moved by the cam 26 and the centering pawl 24 having the projection 24a that is interlocked with the backstop pawl 23. In the state of FIG. 2 wherein the lever 18 is set in the neutral position, the backstop pawl 23 is released from the teeth 20a of the ratchet gear 20, whereas the centering pawl 24 is urged into engagement with the tooth 21a of the centering ratchet 21. The tooth 21a is formed adjacent a predetermined position of the ratchet gear 20 so that the tooth 21a is engaged with the centering pawl 24 when the bail arm is located just below the reel mounting leg 1a). When the cam 26 is rotated clockwise from the neutral position, as viewed in FIG. 2, the backstop pawl 23 urges the centering pawl into engagement with the centering ratchet 21. When the cam 26 is rotated counterclockwise, the centering pawl 24 is disengaged, but the tooth springs 22 and the centering pawl 24 cooperate to urge the centering pawl 24 into engagement with the tooth 21a of the centering ratchet 21, thereby keeping the bail arm 8 out of the way of the line.

As shown in FIG. 2, the projection 9 is located at a position where the pivot arm 11 is engaged with the projection 9 when the centering pawl 24 is engaged with the tooth 21a of the centering ratchet 21.

When the line wound on the spool is cast, the lever 18 is set at the position identified by "A" in FIG. 2. Although the backstop pawl 23 is disengaged from the ratchet gear 20 by the cam 26, the centering pawl 24 may following the rotation of the backstop pawl 23 but the tooth springs 22 sandwich the centering ratchet 21 by frictional resistance, and as such the tooth springs 22 are held in such a position as to enable the tooth 21a of the centering ratchet 21 to be engaged with the centering pawl. Accordingly, if the handle 2 is turned back or line let off while the rod is held at the time the line is cast, the line will be pulled out by the weight at the tip thereof and the rotor will be turned backwards. When the bail arm 8 of the rotor 4 reaches the predetermined position, the tooth 21a and the centering pawl 24 will engage with each other to stop the rotor 4 from turning back and set the rotor 4 in such a position as to facilitate the release of the line when casting.

When the pivot arm 11 is turned clockwise by the lever 12 in FIG. 3 to the degree it exceeds the dead point of the spring 14 in the mechanism, it will be further turned clockwise by the spring force and held in that position, that is, in a lock release position as shown by the dashed lines. Since the pivot arm 11 is separated from the projection 9 of the rotor 4 in that state, the rotor 4 is allowed to turn forward, or in the direction of an arrow B in FIG. 2 as the handle 2 is turned so that line can be wound on the spool 6.

Alternately when the pivot arm 11 is turned counterclockwise by means of the lever 12 to the extent it exceeds the dead point of the spring 14, it will be further turned by the spring force in the same direction and held in that position, that is, a lock position where the pivot arm 11 is allowed to engage with the projecting 9 against the forward direction of rotation of the rotor. In other words, the rotor 4 is prevented from turning. Since the rotor 4 is stopped from turning by means of the backstop mechanism when turned counterclockwise, the rotor will be prevented from turning and it thus completely locked.

If the rotor 4 is turned strongly by the handle with the pivot arm 11 in the locked position, the pivot arm 11 will be pressed by the projection 9 against the spring force and turned as shown by the dashed lines in FIG. 2 so that the locked condition is released. That is, the pivot arm 11 may automatically be released from the projection 9 by turning the handle 2 to overcome the spring 14 locating the pivot arm 11.

The released condition can be, needless to say, attained by turning the lever 12 manually.

The rotor-locking mechanism for a fishing reel is preferrably employed with a self-centering mechanism in the fishing reel described above. Moreover, the rotor-locking mechanism can also be employed with another backstop mechanism as shown in FIGS. 4 and 5.

Figure 5:
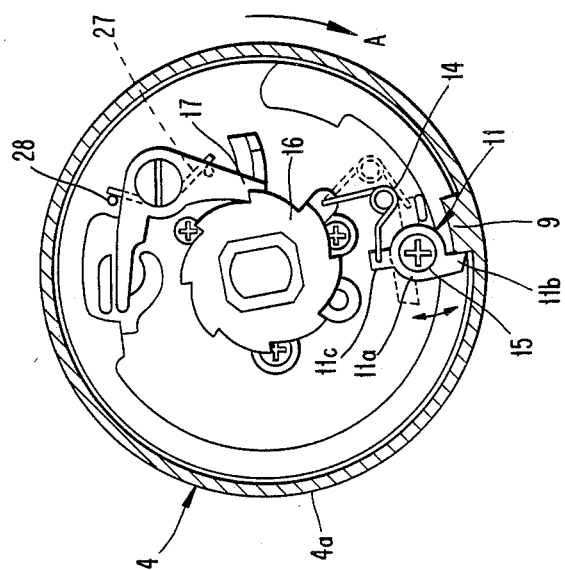
FIG. 5 is a cross-sectional view of the embodiment of FIG. 4 along the line V—V.
Figure 4:
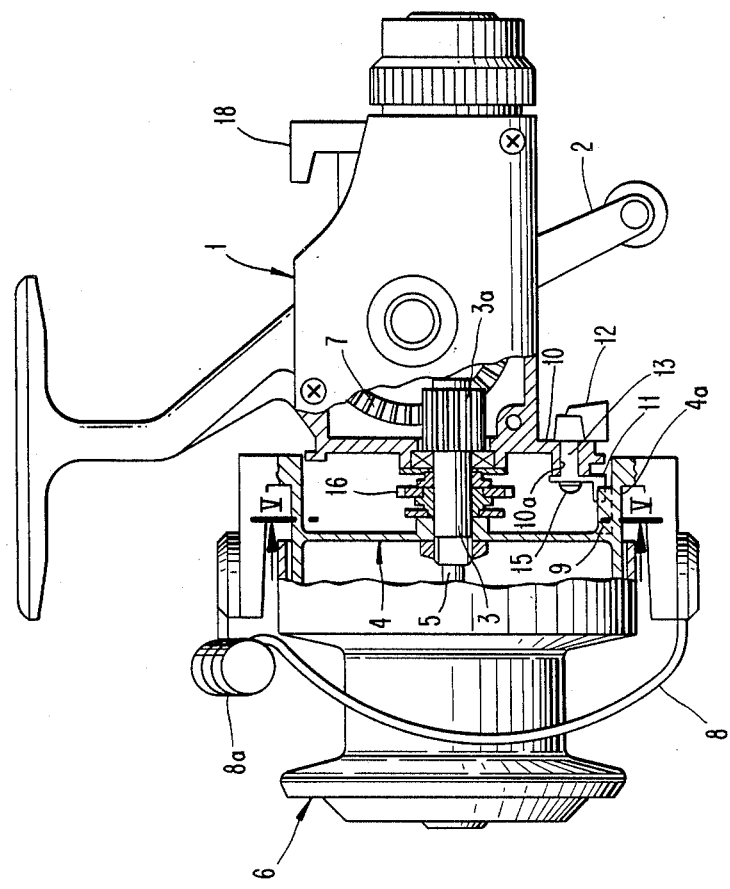
FIG. 4 is a partial cross section of a second embodiment of the present invention.
Figure 6:
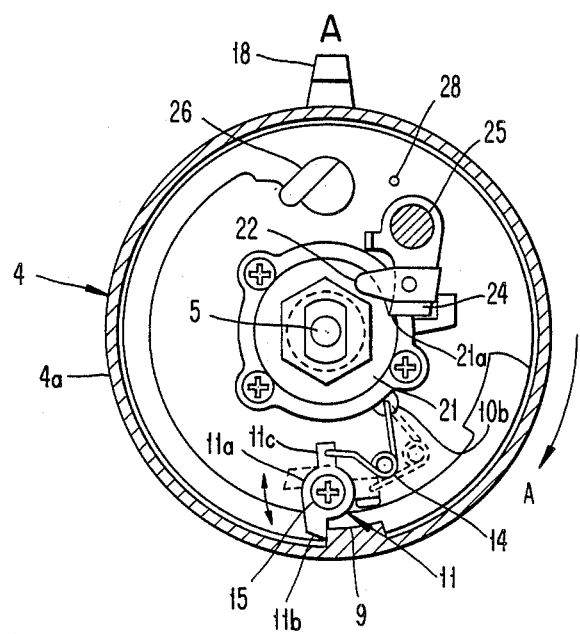

In FIGS. 4 and 5, there is shown a ratchet 16 secured to the tubular shaft 3. The ratchet 16, together with a ratchet pawl 17 which engages the ratchet by means of a lever 18, forms an anti-reverse mechanism for the rotor 4.

In addition, the rotor-locking mechanism of the present invention can be employed in a reel which does not have a backstop mechanism.

In the rotor-locking mechanism for a fishing reel thus arranged according to the present invention, the rotation of the rotor caused by the inertial rotation of the handle arm can be prevented at the time the line is cast. Thus the mechanism prevents the bail arm from having an incorrect position while the rotor is turned when the fish line is cast and also prevents the fish line from being cut because of a tangle on the bail arm roller. Moreover, it eliminates these problems which could cause the loss of a catch. The invention provides a mechanism whereby the rotor can be released from the locked condition manually by operating a lever and also automatically by strongly turning the rotor or handle.

Furthermore, as the rotor may be stopped in the predetermined position where line engagement is readily carried out, line-casting as well as line engagement, by the bail is fulfilled readily, simply and conveniently.

The present invention has been disclosed in terms of preferred embodiments but the invention is not limited thereto. The present invention is defined by the appended claims and their equivalents.

What is claimed is:

1. A spinning-type fishing reel comprising:
   a reel body;
   a rotor rotatably mounted on said reel body for rotation in a line-winding direction and for rotation in a line-casting direction opposite said line-winding direction;
   rotor locking means mounted on said reel body for selectively preventing rotation of said rotor in said line-winding direction, said rotor locking means including a projection extending along an inner surface of said rotor, a pivoting arm pivotally mounted on said reel body for engaging said projection; spring means for applying a resilient force to oppose rotation of said pivoting arm in both directions of rotation of said pivoting arm; and lever means connected to said pivoting arm for selectively pivoting said pivoting arm into engagement with said rotor to prevent rotation of said rotor in said line-winding direction; and
   self-centering means for preventing rotation of said rotor in said line-casting direction, said self-centering means including a ratchet gear; a centering ratchet having a circumferential face and a tooth formed thereon; a backstop pawl disposed to selectively engage said ratchet gear; a centering pawl disposed to selectively engage said centering ratchet; a cam adapted to selectively engage said backstop pawl and said centering pawl with said ratchet gear and said centering ratchet, respectively; and tooth springs disposed to bias said centering pawl to allow said centering pawl to engage said tooth in the neutral position when said backstop pawl is released from said ratchet gear.

2. The reel of claim 1 wherein said rotor locking means includes a shaft affixed to said pivoting arm, said shaft also being affixed to said lever means for rotation therewith.

3. The reel of claim 1 wherein said spring means is a torsion spring having a first end attached to said reel body and a second end to attached said pivoting arm.

* * * * *